UNITED STATES PATENT OFFICE.

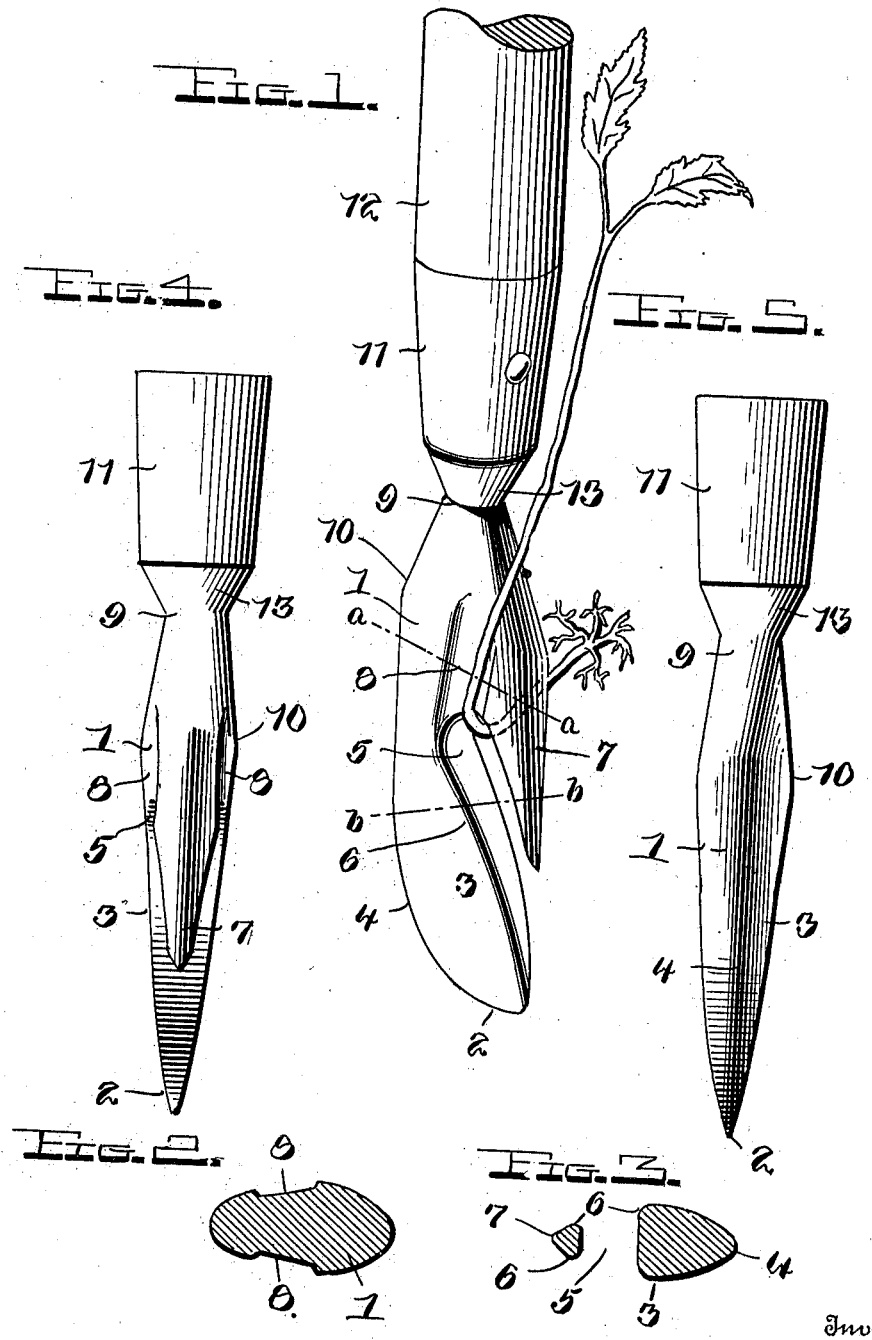

JOHN B. CARPENTER, OF COLQUITT, GEORGIA, ASSIGNOR OF ONE-HALF TO WILLIAM J. BUSH, OF COLQUITT, GEORGIA.

TRANSPLANTER.

982,575.

Specification of Letters Patent.  Patented Jan. 24, 1911.

Application filed August 10, 1910. Serial No. 576,460.

*To all whom it may concern:*

Be it known that I, JOHN B. CARPENTER, a citizen of the United States, residing at Colquitt, in the county of Miller and State of Georgia, have invented certain new and useful Improvements in Transplanters, of which the following is a specification, reference being had to the accompanying drawings.

This invention is an improved transplanter, especially adapted for use in setting out sweet potato plants, but also adapted for use in setting out plants of other kinds, the object of the invention being to provide a cheap, simple and efficient tool or implement of this description by means of which sweet potato and other plants may be readily and expeditiously set out or transplanted without injury thereto.

The invention consists in the construction and arrangement of devices hereinafter described and claimed.

In the accompanying drawings,—Figure 1 is a perspective view of a transplanting implement constructed in accordance with my invention, also showing a portion of the handle to which the same is attached. Fig. 2 is a transverse sectional view of the same on the plane indicated by the line *a—a* of Fig. 1. Fig. 3 is a similar view on the plane indicated by the line *b—b* of Fig. 1. Fig. 4 is an elevation of the same on a plane at right angles to that of Fig. 1. Fig. 5 is a similar view, showing the opposite side of the transplanter.

The head 1 of my improved transplanter is substantially elliptical in cross section, and its point 2 is wedge-shaped, the broader sides of the pointed portion of the head being flattened as at 3, and converging toward the end of the head so as to form an edge 4, which edge is rounded from the point to one side edge of the head. The wedge-shaped entering portion of the head is provided with a curved slot 5 which is open at one end of the pointed end of the head, and extends upwardly and inwardly in the head, the closed, upper end of the said slot being disposed substantially in the center of the head, and the edges of the slot being rounded as indicated in Figs. 1 and 3, said rounded edges being designated by the numeral 6.

On one side of the head is a bill or arm 7, the inner side of which forms the outer side of the slot, and the said bill or arm is reduced and pointed downwardly. In opposite sides of the head are upwardly extending channels 8 which incline upwardly toward that side of the head on which the arm or bill 7 is disposed. The head is provided with a diametrically reduced neck 9, that portion of the head above the channels 8 and the arm 7 being upwardly tapered, so that a shoulder 10 is formed between the neck and said channels, and the head is formed at its extreme upper end with an integral socket or ferrule 11, for the reception of the lower end of a handle or stick 12, the lower end of the said ferrule, where it joins the neck, being tapered as at 13.

The operation of my improved transplanter is as follows: The ground having been prepared in the usual way, the vines are dropped across the ridges at the required distance apart. The transplanter is grasped by the handle, and thrust downwardly into the ground at the point where each plant is, and so directed as to cause the plant to be engaged near its root in the slot of the transplanter, as indicated in Fig. 1, so that the root extremity of the plant will be on one side of the transplanter and the stem thereof on the other, and so that the stalk or stem of the plant will be disposed in one of the channels 8. It will be understood that as the transplanter is thrust down into the ground, being thus engaged with the plant, it will carry the plant downwardly therewith. Owing to the fact that the slot 5 inclines and opens at its lower end at one side of the entering point, earth is prevented from entering the said slot and affording such resistance to the plant as to cause the plant to be cut at the point where it engages the slot. The channels 8, also, one of which will as above indicated, receive the stalk of the plant, serve to prevent the plant from being rubbed and injured against one side of the hole made by the transplanter as the latter is descending in the earth. The said channels, as will be observed, upon reference to Fig. 1, are also inclined and their upper ends open on the reduced portion of the transplanter formed by the neck, the shoulder below the neck thus affording clearance for the plant, and the inclined channel engaged by the stem of the plant direct the latter to one side of the ferrule 11, preventing the plant from being injured by being rubbed between the ferrule and the earth.

Having thrust the implement down to an appropriate depth in the soil, and as the transplanter moves downwardly, the surface 6 constituting the lower side of the slot 5 by engaging the plant will straighten the latter in the hole and leave the root portion thereof near or slightly spaced above the bottom of the hole which is a position advantageous to the growth and development of the plant.

In practice my improved transplanter may be made very cheaply of malleable iron or other suitable metal.

I claim:

1. A transplanter of the class described having a wedge shaped point, an inclined slot open at its lower end, at one side of said wedge shaped point, and an inclined channel in one side of said transplanter, and extending from the upper end of the said slot, to one side of said transplanter.

2. A transplanter of the class described having a wedge-shaped point and an inclined slot open at its lower end at one side of said wedge shaped point, closed at its upper end, and the lower side of which is formed by the base of said wedge-shaped point.

3. A transplanter of the class described having a wedge shaped point and an inclined slot open at its lower end, closed at its upper end at one side of said wedge shaped point, and the lower side of which is formed by the base of said wedge-shaped point, the transplanter being further provided with an upwardly extending channel on one side communicating with the upper portion of said slot.

4. A transplanter of the class described having a wedge-shaped point and an inclined slot open at its lower end at one side of said wedge shaped point, closed at its upper end, and the lower side of which is formed by the base of said wedge-shaped point, and a contracted portion forming a shoulder above said channel.

5. A transplanter of the class described, having a substantially cross-sectionally elliptical head provided with an inclined slot open at its lower end at one side of said wedge shaped point, and closed at its upper end, a wedge-shaped entering point, the base of which is formed by the lower side of said slot, a downwardly extending arm forming one side of the closed upper end of said slot, channels in the sides of the closed upper end of said slot, and further provided with a reduced upper portion forming a shoulder at the upper ends of, and above the said channels.

In testimony whereof I hereunto affix my signature in the presence of two witnesses.

JOHN B. CARPENTER.

Witnesses:
B. B. ROBERTS,
W. P. HARRELL.